3,438,492
BIRD SWING DETECTOR
Walter R. Albers, Union City, and Arthur T. Miller,
Wayne, N.J., assignors to Owens-Illinois, Inc., a
corporation of Ohio
Filed Feb. 17, 1967, Ser. No. 616,883
Int. Cl. B07c 5/342
U.S. Cl. 209—111.7                                      6 Claims

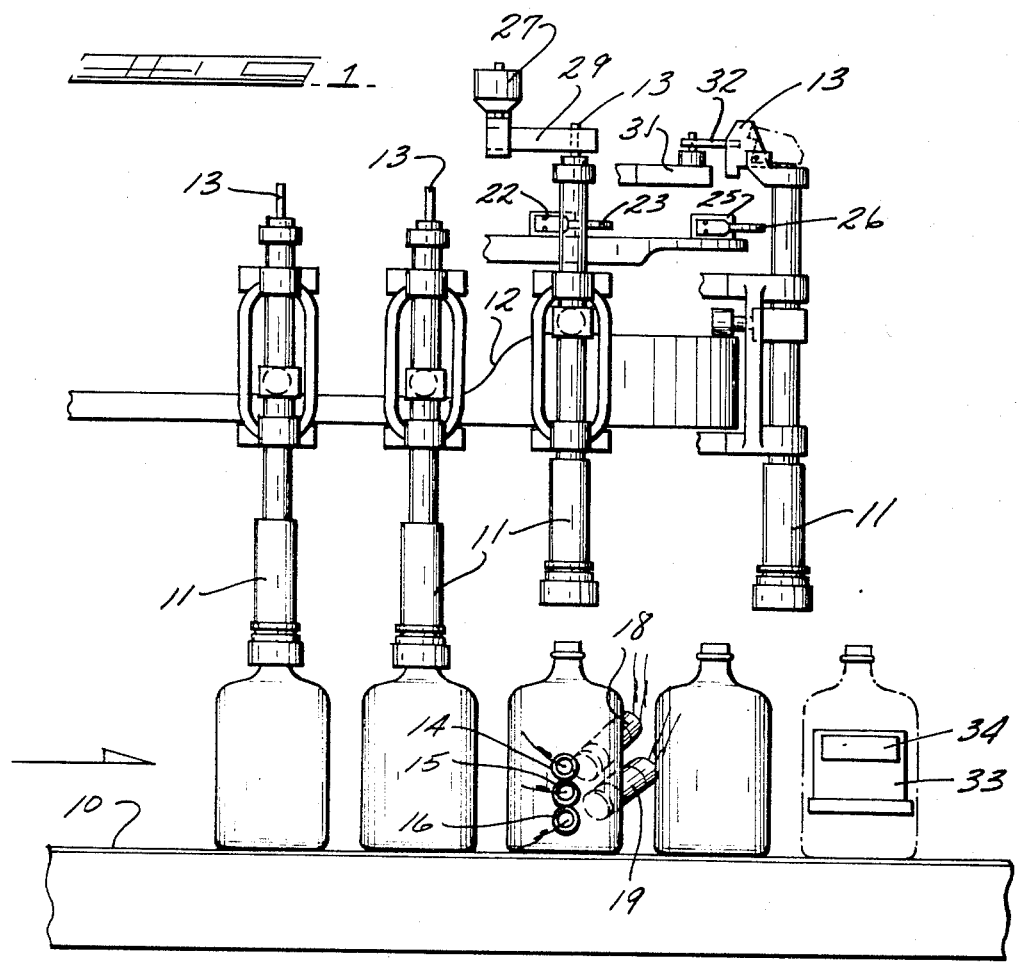
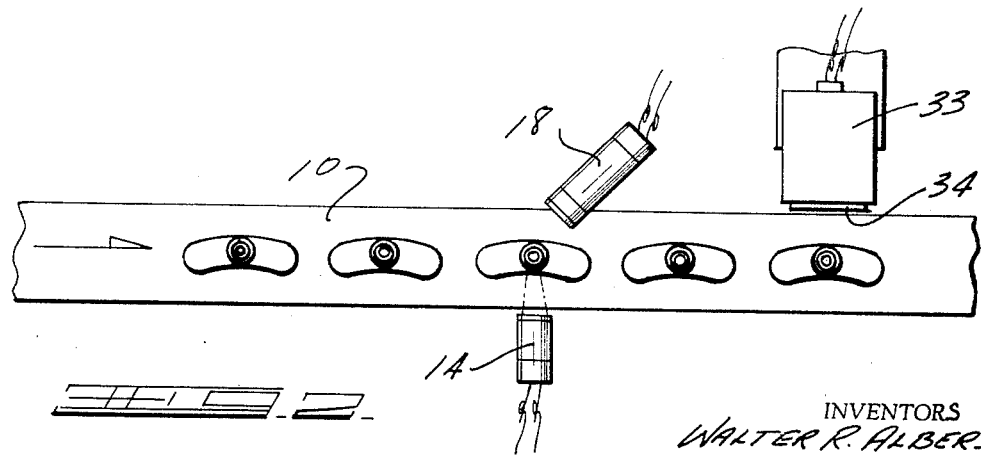

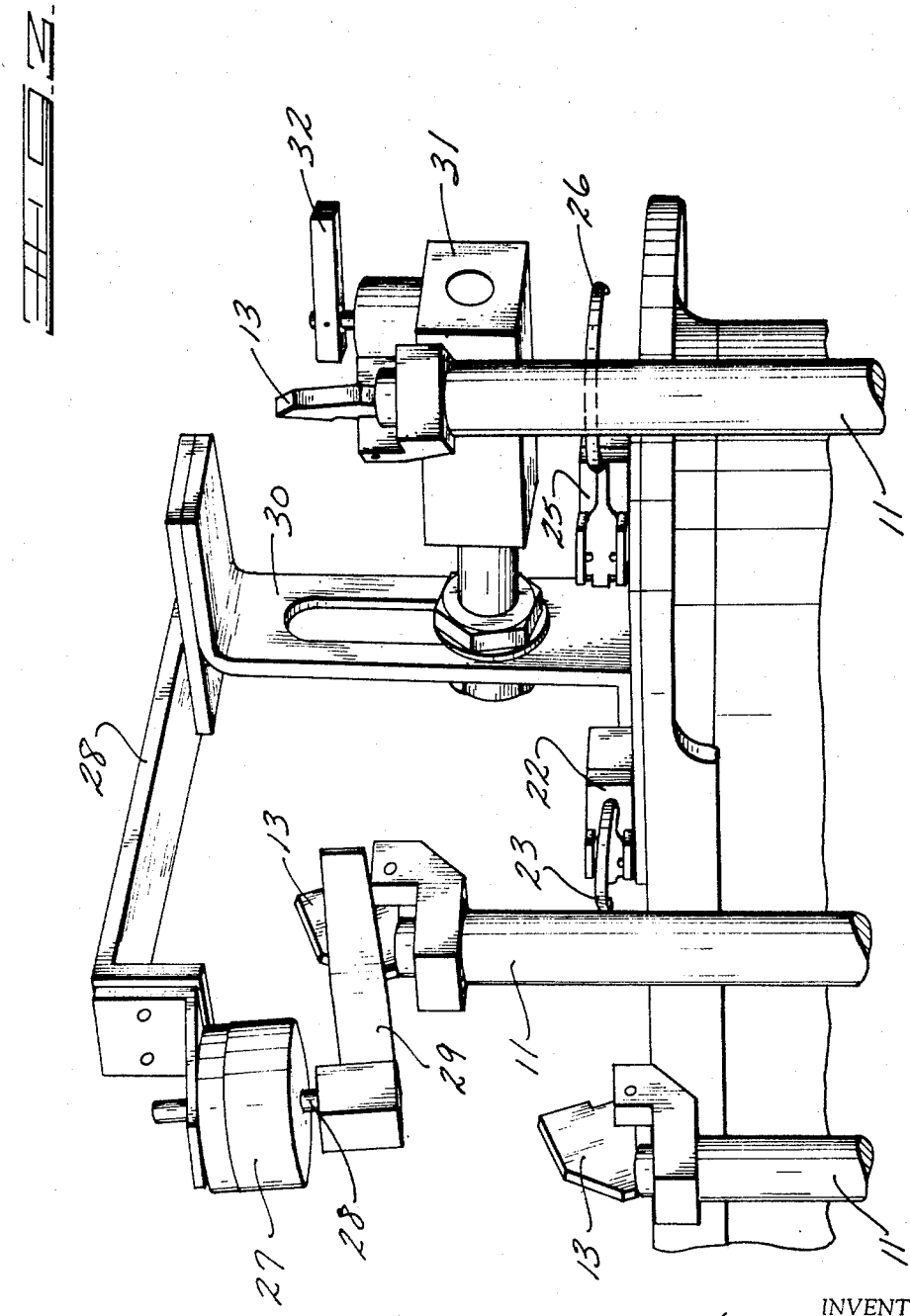

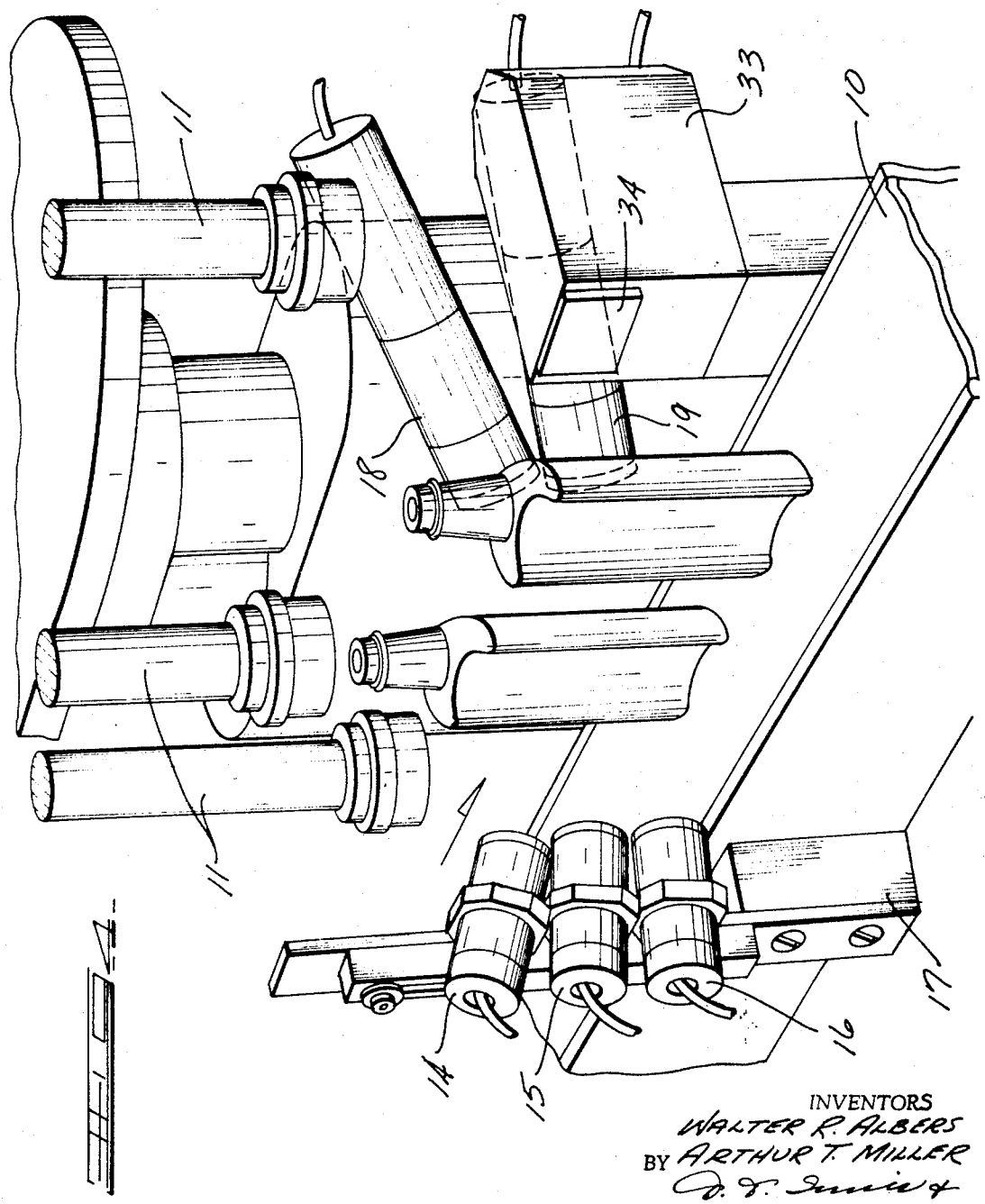

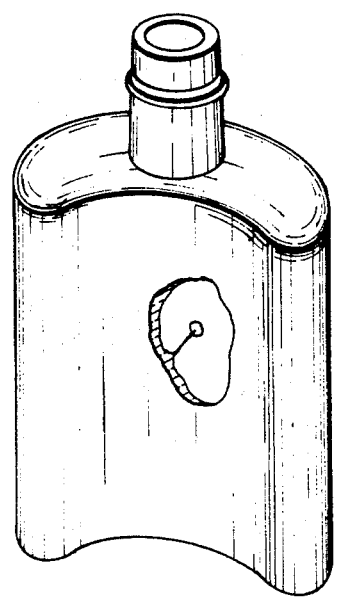
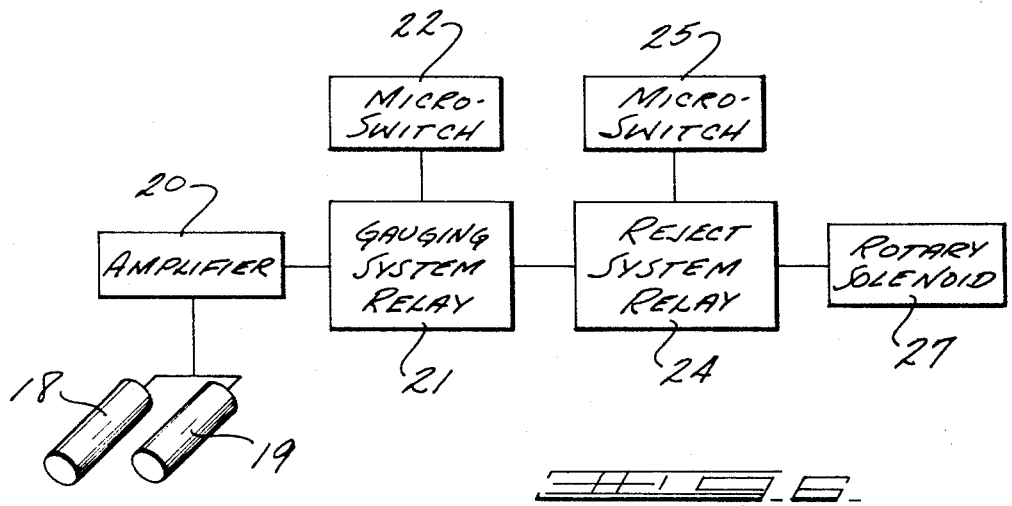

ABSTRACT OF THE DISCLOSURE

Method and apparatus for inspecting glass containers to determine the presence of the defect termed "bird swing."

Containers to be inspected are moved in series on a conveyor with the containers being spaced apart by the operation of a plug gauging mechanism. After plug gauging, the containers are moved through an inspection position where beams of light are projected toward the side wall of the container to be inspected, with the light being focused on the further wall of the container and a pair of photo-sensitive elements are positioned adjacent to the container to view the illuminated wall portion of the container at an angle with respect to the direction of the light beams. When light is received by the pick-ups due to the presence of a "bird swing," a relay is operated to actuate a solenoid to position a flag member carried by the corresponding plug gauging head into position to be operative to close a reject switch in timed sequence so that the defective container will be moved from the line of containers and be segregated from the good containers.

Background of the invention

The present invention is utilized in combination with an old and well-known plug gauging apparatus disclosed in U.S. Patent 2,596,342, May 13, 1952. Reference may be had to this patent when considering the relationship of the present invention to the mechanism for spacing and aligning the containers prior to their arrival at the "bird swing" detecting station.

In the ordinary operation of the above-referred-to plug gauger, the containers will be moved by a conveyor in the direction of the arrow shown in FIGS. 1 and 2. The containers will be spaced apart and aligned by a worm infeed mechanism (not shown) but clearly described and shown in the above-referred-to Patent 2,596,342.

The plug gauging mechanism comprises a plurality of bottle neck engaging devices or heads. Each of the plug gauging heads is moved in series in the direction of the movement of the containers and will engage the neck of successive containers as they move into position beneath the gauging devices.

For the purpose of fully understanding the relationship of the present invention with the mechanism of the conventional plug gauger, it should be pointed out that the gauging heads move in a generally oval pattern, as viewed from above, and at the end of the plug gauging cycle, the heads will be lifted from the necks of the containers by a stationary cam whose shape is such as to permit the heads to gauge the necks of the bottles and then raise the heads from the bottle necks so that the bottles continue in a straight line while the heads move in an oval path.

Each of the plug gauging heads carries a flag at its upper end. The flags are pivotally connected to the heads and, as clearly disclosed in the Patent 2,596,342, if a container having an unsatisfactory neck is gauged, then the flag will be pivoted counter-clockwise from the position illustrated in dotted line in FIG. 1 of this application, to the full line position of the head illustrated at the right in FIG. 1.

As previously stated, each of the plug gauging heads will be moved by mechanism (not shown) in an oval pattern wherein the heads move in a straight line parallel to the movement of the conveyor during the gauging operation. In this manner the bottles are spaced and oriented during the plug gauging operation.

Applicants have found that the "bird swing" defect is the most prevalent when forming glass containers in the shape of flasks, as specifically illustrated in FIG. 5. The "bird swing" defect is the result of the two sides of the bottle contacting each other during the formation of the parison and prior to blowing of the container into its final shape. As would be expected, when the two sides of the container touch, the hot, relatively "tacky" glass will fuse and as the container is expanded by air under pressure being introduced thereinto, the sides that have touched will move away from each other drawing a small thread of glass therebetween, thus forming what is termed a "bird swing."

In the formation of bottles it is necessary to form a parison or pre-form which is hollow; however, the diameter of the internal space formed in the parison may not be of extensive size, particularly in those situations where the container to be formed is of the narrow-neck variety. A commonly used forming machine forms the parison with the neck down and thus prior to final blowing of the container within a blow mold it is necessary that the parison be inverted. It will be readily appreciated that during the inversion of a relatively hot, elongated, hollow body of glass there is the possibility that the parison will collapse to a slight extent sufficient to cause the internal walls of the parison to touch each other, thus resulting in the formation of a "bird swing." The "bird swings" are not necessarily formed within their final shape by the presence of a thread running completely between the two inner side walls, it being understood that the thin filament of glass which would span the diameter of the container may break due to its becoming extremely thin and cooling quicker becoming rigid to the extent that it would break rather than continue to stretch. However, in every instance when a "bird swing" is formed, there will be small conical protuberances from the side walls in the direction of the opposite side wall, coincident with the formation of the "bird swing."

Summary of invention

The present invention is directed to an optical system for inspecting containers which is effective to determine the presence or absence of conical, inwardly extending formations of glass within the interior of completed containers commonly termed "bird swings."

The defect is illuminated by at least one focused beam of light directed through the side of the container and focused on the diametrically opposed side wall of the container. The beam is also directed at an angle with respect to the horizontal. At least one light-sensitive pick-up is positioned opposite the illuminated container wall with its axis at an acute angle with respect to the beam axis and directed to view the container wall. The detector circuit is gated on and off in sequence with the movement of the containers into precise inspection position. The output of the gauging circuit is fed to a reject system and relay to operate a solenoid to position a flag in reject position.

Brief description of the drawings

FIG. 1 is a side elevational view of the apparatus of the invention;

FIG. 2 is a top plan view illustrating the optical inspection system of the invention;

FIG. 3 is a perspective view on an enlarged scale of the upper switching and reject system of the invention;

FIG. 4 is an enlarged perspective view of the inspection and reject station of the invention;

FIG. 5 is a perspective view of a container illustrating the "bird swing" defect; and FIG. 6 is a schematic circuit diagram of the reject system of the invention.

As previously stated, the containers to be inspected for "bird swings" are moved by a conveyor 10 in a straight line. The containrs are first plug gauged by the plug gauging heads 11, of which there are a plurality on the mechanism. At the conclusion of the plug gauging operation the containers will continue to be moved by the conveyor at spaced-apart intervals determined by the spacing of the gauging heads 11. As clearly shown in FIG. 1, the heads 11 are raised from the necks of the containers by a stationary cam 12 having an upwardly sloping top surface. As clearly disclosed in the above-mentioned Patent No. 2,596,342, each head 11 carries a flag 13 pivoted to the upper end thereof. The flags 13 are pivoted counterclockwise when a chocked neck is gauged and the flag initiates the bottle reject mechanism, later described.

With the foregoing background, applicants provide an arrangement of three light sources 14, 15 and 16 positioned at right angles with respect to the direction of movement of the containers, with each of the lights having its own self-contained lens system and being positioned on a bracket 17 fixed to the side of the conveyor 10 so that their axes for direction of the beams of light produced by the three light sources will be directed toward the side walls of the containers when in inspection position. As stated, the longitudinal axis of each of the lights is slightly different so that they will present three beams slightly converging toward the side walls of the bottle. The focal length of the beams is such that they will focus the light on the further wall of the bottles.

As can be seen when viewing FIG. 4, the light sources are oriented so that the beams of light are angled downwardly toward the container or bottle.

In normal operation, these lights will be constantly energized so as to provide continuous illumination to the containers as they move into inspection position.

Positioned on the opposite side of the container from the lights are a pair of light-sensitive pick-up elements 18 and 19, with their axes downwardly inclined at 20°–5° with respect to the horizontal and directed at the adjacent side of the bottle which is being illuminated by the lights. It should be understood that these pick-ups are focused so that any light reflected from the inside of the bottles which emerges in the direction of the pick-ups will be collected by the lens system in the pick-ups and focused on photo-sensitive elements mounted therein. The pick-ups are of conventional design. In the event the bottles have no defects, it would be expected that the light would pass out of the containers in substantially the same direction as the light beams without deviation.

As can readily be seen when viewing FIG. 2, the pick-ups 18 and 19 are positioned at an angle approximately 135°–150° with respect to the axis of the light beam. Thus the pick-ups will only sense light which is reflected out of the normal path of the light beam. It has been found that the angle of 135°–150° is the angle at which significant light is reflected from a "bird swing." It is applicants' experience that "bird swings" occur at a generally known area for any bottle shape and it may readily be appreciated that the lights and pick-ups are so arranged and are adjustably mounted so that they will illuminate the "bird swings" from the optimum angles.

The pick-ups 18 and 19 are connected through an electrical system, and as shown in FIG. 6, this may be an amplifier 20 and gauging relay 21 so that the signal output of the pick-up will be amplified and operate a gauging relay. The gauging relay is normally inoperative so that spurious readings or erroneous signals will not be fed therethrough. Thus, in order to ensure that the signals are only significant at the moment of gauging, the plug gauging head 11, which is positioned axially above the container positioned at the inspection station, will close a microswitch 22.

As can best be seen when viewing FIG. 3, the microswitch 22 has an operating arm 23 mounted so that the gauging device 11 will trip the switch 22 momentarily as the head moves in its normal path. When the switch 22 is closed, the gauging relay 21 is rendered operative in the sense that the gauging relay system is energized so that if a signal is received from the amplifier 20, it will be passed through to a reject relay 24.

The reject relay is also normally inoperative without receipt of a switching signal and this signal is provided by a microswitch 25. The microswitch 25, as best seen in FIG. 3, has an operating arm 26 positioned so that it will be engaged by the gauging device 11 which is the next device 11 ahead of the one positioned directly above the container being inspected. The arm 26 of the switch 25 will be engaged by the device 11 prior to the opening of the switch 22 so that if a "bird swing" is sensed, the signal from the gauging relay will be received by the reject relay and enabling switch 25 will be operated to actuate the reject relay and feed a reject signal to a rotary solenoid 27.

As indicated in FIG. 3, the rotary solenoid 27 is mounted on an extending bracket 28 so that its axis is positioned substantially vertically. The solenoid 27 has an output shaft 28 to which is clamped a radially extending arm 29. The arm 29 is adapted to engage the flag 13 upon energization of the solenoid 27. When the solenoid is operated, the arm 29 will move the flag from the position shown in FIG. 3 to a position such as that shown in full line in FIG. 1. This is accomplished by merely pivoting the flag 13 about its horizontal pivot axis. The reject relay remains energized for a time sufficient to assure that the solenoid is operated and that the arm 29 will have pivoted the flag 13.

Both the switches 22 and 25 are mounted on the upper support structure of the plug gauging mechanism and a vertically extending bracket 30, also mounted on the upper support structure of the plug gauging mechanism, serves as the support and anchor for the inner end of the arm 28 and also serves as an adjustable mounting for a switch 31. The switch 31 has an operating arm 32 extending radially therefrom and normally in the path of the movement of the flags 13, if the flags have been moved to reject position.

As can clearly be seen in FIG. 1, if the flag has not been pivoted in a counter-clockwise direction, the flag will pass the switch arm 32 without engagement. However, if the flag 13 has been pivoted, it will engage the arm 32 and thus the switch 31 will be actuated. The switch 31 is connected to a reject solenoid 33. The front face of the reject solenoid 33 is provided with a bottle engaging pad 34 and if the reject switch 31 is operative, the solenoid 33 will operate to push the bottle or container positioned in front thereof off the line, thus segregating a bad bottle from the good bottle.

It can be seen that with the arrangement disclosed, the receipt of a reject signal by the photocells will operate the rotary solenoid 27 to position the flag 13 in reject position. As the bottle, which has been gauged, moves on the conveyor 10, it will arrive in front of the reject solenoid 33 at the same time that the gauging head or device 11, bearing the flag 13, will arrive in position to engage the reject switch arm 32.

We claim:

1. Apparatus for inspecting glass containers for "bird swings" in combination with a horizontal, moving belt conveyor and a plurality of gauging heads adapted to move in overlying relationship with respect to said conveyor and to engage the finish portion of containers as they are moved in a straight line by the conveyor, a light source mounted to the side of said conveyor and adapted to project a focused beam of light normal to the path of travel of the conveyor to illuminate a preselected area of the opposite side wall of the containers, a light-sensitive pick-up mounted on the opposite side of said conveyor, said light-sensitive pick-up having its line of sight directed toward the area of illumination of said light beam, gauging system means connected to said pick-up, first switch means connected to said gauging system to actuate said gauging system at predetermined intervals, said first switch being actuated by the movement of one of said gauging heads into a predetermined position corresponding to the movement of a container into said light beam, reject system means connected to said gauging system, second switch means connected to said reject system means for conditioning said reject system to pass signals from the gauging system, said second switch being operative for a finite interval beginning just prior to opening of said first switch means, a reject flag pivotally mounted on each gauging mechanism, a rotary solenoid connected to said reject system, and means mounting said solenoid above the path of travel of said gauging heads and operative upon actuation to pivot the reject flag.

2. The apparatus of claim 1, further including a third switch mounted on said mechanism in the path of movement of a pivoted reject flag and reject means connected to said third switch for ejecting defective containers from said conveyor.

3. The apparatus of claim 2, wherein said reject means is a solenoid mounted at the side of said conveyor at a downstream position relative to said light beam whereby upon actuation of said third switch the solenoid engages the side of the container positioned in front of it and moves the container off the conveyor.

4. The apparatus of claim 1, further including two additional sources of light for projecting two additional beams of light transverse of the direction of movement of the containers, said two additional light sources being mounted so their beams are directed slightly downward and increase the illuminated area of the opposite side of the container.

5. The apparatus of claim 4, further including an additional light-sensitive pick-up mounted adjacent the other pick-up, both said pick-ups having their axes aligned at downwardly inclined angles with respect to the illuminated area being viewed and both connected to said gauging system.

6. The apparatus of claim 5, wherein said pick-ups are positioned at an acute angle with respect to the vertical plane defined by the incident light beams.

References Cited

UNITED STATES PATENTS 2,439,490    4/1948    Schell _____ 88—14 X
3,030,516    4/1962    Seavey _____ 88—14 X M. HENSON WOOD, Jr., *Primary Examiner.*

R. A. SCHACHER, *Assistant Examiner.*

U.S. Cl. X.R.

250—223; 88—14